(12) United States Patent
Amaro-Barboza (10) Patent No.: US 10,780,518 B2
(45) Date of Patent: Sep. 22, 2020

(54) CONTROL HEAD AND MAGNETIC HOLDER FOR AUTOMATIC WELDING

(71) Applicant: Eduardo Miguel Amaro-Barboza, Montevideo (UY)

(72) Inventor: Eduardo Miguel Amaro-Barboza, Montevideo (UY)

(*) Notice: Subject to any disclaimer, the term of this patent is extended or adjusted under 35 U.S.C. 154(b) by 440 days.

(21) Appl. No.: 15/638,549

(22) Filed: Jun. 30, 2017

(65) Prior Publication Data
US 2018/0009055 A1    Jan. 11, 2018

(30) Foreign Application Priority Data

Jul. 11, 2016 (UY) .......................................... 36783

(51) Int. Cl.
| | |
|---|---|
| *B23K 9/16* | (2006.01) |
| *B23K 37/02* | (2006.01) |
| *B23K 9/025* | (2006.01) |
| *B23K 9/095* | (2006.01) |
| *B23K 10/02* | (2006.01) |
| *B23K 37/00* | (2006.01) |
| *B23K 37/04* | (2006.01) |
| *B23K 101/10* | (2006.01) |

(52) U.S. Cl.
CPC .............. *B23K 9/16* (2013.01); *B23K 9/0253* (2013.01); *B23K 9/095* (2013.01); *B23K 10/02* (2013.01); *B23K 37/003* (2013.01); *B23K 37/0264* (2013.01); *B23K 37/0426* (2013.01); *B23K 2101/10* (2018.08)

(58) Field of Classification Search
CPC .......... B23K 7/00; B23K 9/0253; B23K 9/16; B23K 9/095; B23K 10/02; B23K 37/003; B23K 37/0264; B23K 37/0426; B23K 37/0252; B23K 37/0288; B23K 37/0294; B23K 37/0211; B23K 37/0217; B23K 37/0282; B23K 2101/10
See application file for complete search history.

(56) References Cited

U.S. PATENT DOCUMENTS

| | | | | |
|---|---|---|---|---|
| 4,527,033 A | * | 7/1985 | Matsuyama | C21D 9/50 219/60 R |
| 6,641,029 B2 | * | 11/2003 | Bonnell | B23K 37/0533 228/170 |
| 2006/0027952 A1 | * | 2/2006 | Meissner | B23K 37/0264 266/67 |
| 2015/0158129 A1 | * | 6/2015 | Matthews | B23K 37/0294 219/138 |

FOREIGN PATENT DOCUMENTS

DE          10063776 C1 *   4/2002  .......... B23K 9/0286

OTHER PUBLICATIONS

Machine Translation DE10063776 published Apr. 2002 performed Aug. 22, 2019 (Year: 2019).*

* cited by examiner

*Primary Examiner* — Brian W Jennison
(74) *Attorney, Agent, or Firm* — Eugenio J. Torres-Oyola; Victor M. Rodriguez-Reyes; Ferraiuoli LLC (57) ABSTRACT

Double magnetic coupling for two welding heads that work parallel and independent at the front and at the back, (N) and (S), in paramagnetic and diamagnetic materials.

4 Claims, 5 Drawing Sheets

CONTROL HEAD AND MAGNETIC HOLDER FOR AUTOMATIC WELDING

BACKGROUND OF THE INVENTION

The invention refers to two complete welding heads and an inert gas (N) for external and internal (S) backing which work synchronously and magnetically coupled through two or more force fields of the two integrated systems of electromagnets or permanent magnets.

The design of the (N) and (S) devices for welding and inert gas backing has on each side indistinctly, rolling paramagnetic aluminum plates. These plates house in their structure magnets or electromagnets of inverted polarity (N) (S). The rolling and articulated designs keep the coupling and the parallel alignment constant with each other, making it possible to weld the sides of the outer and inner material simultaneously with the independent power sources. The invention of the double head and magnetic coupling welding are designed to work on paramagnetic and diamagnetic materials compatible with the process.

The equipment and system provides an exclusive technical solution to solve the physical obstacles of welding and gassing, with front and back purge, sheets and plates of various thicknesses of austenitic stainless steels and strategic materials such as titanium and aluminum. The food, laboratory, chemical, oil, nuclear and aerospace industries, together with their multiplicity of applications and technical levels of superior excellence, are the ideal center for the use of the system.

Foods

The aim of the invention is to provide equal importance to the internal side of the weld, since for example in stainless steel vessels for the dairy industry and laboratories, sanitary welding requires an oxygen free atmosphere to avoid internal porosities, providing a smooth surface and thereby allowing the more appropriate asepsis and hygiene in the moment of internally cleaning the equipment in which the different products are elaborated. Milk industry tank welding.

The higher level of welding is achieved by maintaining an atmosphere with the inert gas on the back or by welding the stainless steel directly under the protection of gases such as argon.

Current technique achieves sanitary welding in stainless steel tubes of reduced volume by purging the interior completely out of oxygen using inert gases as backing. For containers of large dimensions and volumes this practice is anti-economic. Current technique for the assembly of containers of large volumes uses as technological response a mechanical arm with internal support to back up with gas the welding that is done from the outside. The invention of the double welding head (N) and (S) and backing of an internal inert gas when having a double magnetic coupling allows not to use mechanical supports for the internal contribution of gas as backup. Instead it uses a double coupling with electromagnets or permanent magnets increasing its performance. Its versatility will be increased significantly, allowing welds on both sides and simultaneously with immediate magnetic controls and direct from outside (N).

Stainless Tubes with Laser Seams and Gas Backing with Magnetic Coupling

The double magnetic welding head (N) and (S) can make high quality laser longitudinal seams for the production of stainless steel oil and gas pipelines. The need to transport oil products in a highly corrosive and hostile environment such as the sea, requires proven and reliable materials. Obtaining high quality pipes at proper prices and costs is very important. The anticorrosion capacity of the various steel 316 alloys together with their structural strength, combined with the reliability of the advanced welding system, will make the execution of the work in the marine and ground installations much easier. The stainless steel can be easily threaded and welded by the ends joined through couples or flanges and gaskets. The weldability of stainless steel with backing is excellent.

Orbital Welding with Magnetic Backing Coupling

The magnetic invention of the backing with inert gas improves current orbital welding heads and turns them into the ideal technology for working with stainless steel oil and gas pipelines.

TIG or MIG hybrid circular outer welds and inert gas backing would favor the creation of seamless high-quality welds. The inside and outside protection against environment corrosion without paints or coatings of any type in the joints, would increase the quality of the current installations.

The invention enables external (N) and inner (S) circular or longitudinal welds for pipes and plates of varying thicknesses. This procedure is performed through laser heads, TIG, MIG or hybrids with an inert gas backing.

The laser head has advantages and can fully and longitudinally weld the thickness of the oil pipeline due to the penetration into the plates and a magnetic coupling (S) that carries gas into the interior as backing using an extended diffuser. Lengths of 10 m, 20 m or more meters of length of oil or gas pipelines made from rolling stainless steel plates is an economic and technical possibility.

The magnetic system (N) forms part and is screwed to the outer orbital welding head.

This standard orbital head uses a variety of models that roll through an outer rail attached to the welding tube by which it runs and moves through the circumference.

The outer assembly consists of a complete welding torch.

This special orbital welding system with magnetic coupling and with inert gas backing punctual and directly into the interior of the tube through a localized gas head (S).

The inner orbital head (S) may have an independent energy source and gas, plus everything necessary to weld the stainless steel and the materials magnetically compatible with the system.

The complete inner head (S) with energy and gas accompanies the outer movement of the orbital head (N) by welding both sides, outer and inner, simultaneously.

For double orbital welds (N) and (S), MIG, TIG or hybrid sources are the main option.

The laser light system for welding and magnetic backing has more specific applications in the production of tubes and ducts, adapting better to the work done in plants and factories.

DETAILED DESCRIPTION

The invention of the magnetic welding system and coupling is adapted to two different specific circumstances.

It offers two different and very important options eliminating in both cases the internal backing mechanical support, providing development possibilities and new applications still undetermined for sectors that require high quality industrial welding.

Interior Backing (S) with Magnetic Coupling

Figure 1:
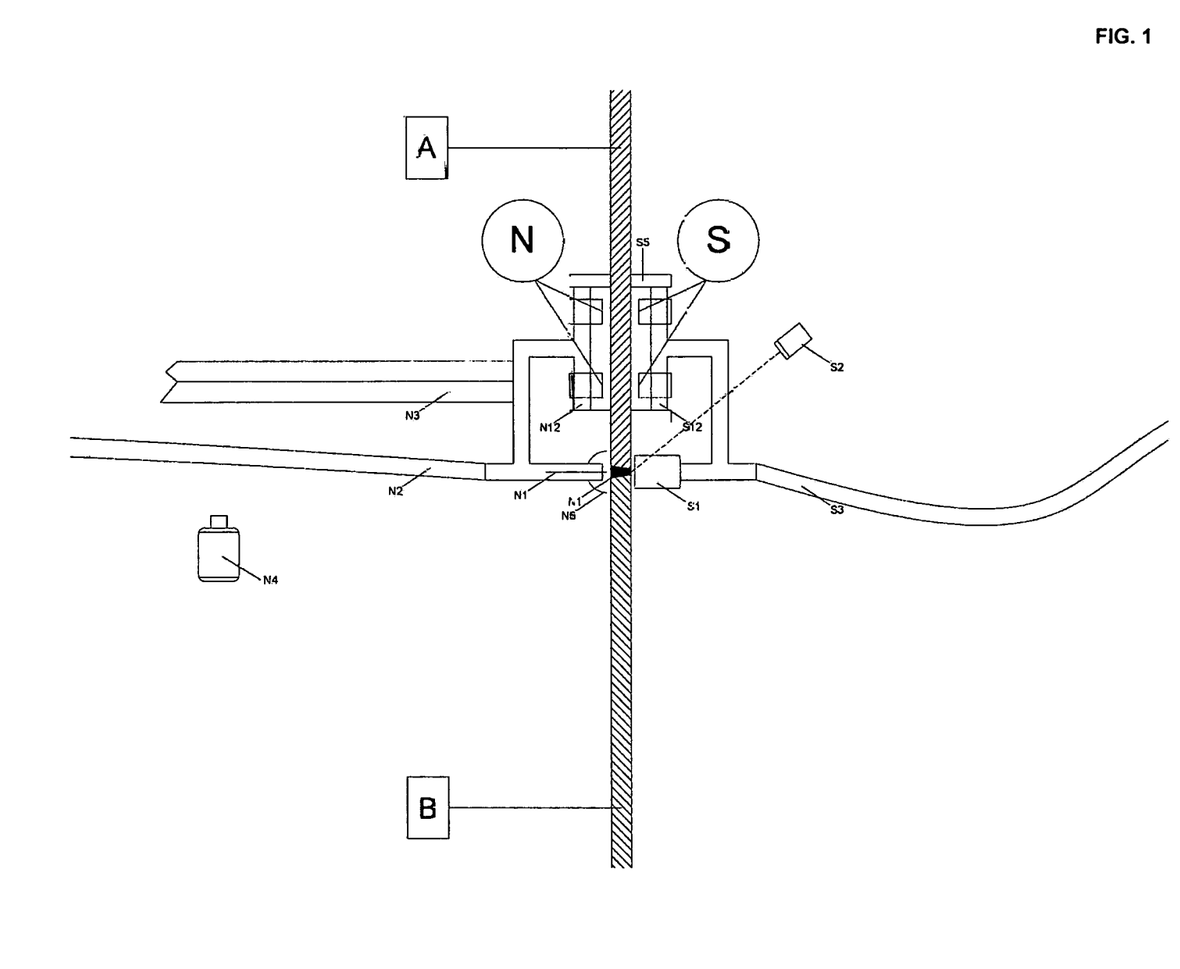
FIG. 1 shows an embodiment of the control head and magnetic holder.

FIG. 1 shows an embodiment of a double welding system and backing of inert gas with magnetic coupling. When the material to be welded is of reduced thickness of between 1, 2, 3 mm, the head (N) welds and applies gas to the front and the invention with magnetic coupling (S) locates backing inert gas internally directly on the melting point. In this way an oxygen-free atmosphere is obtained on the back achieving high quality weldings in the interior.

FIG. 1 shows welding plates A and B. On the outer side of welding plates A and B, FIG. 1 shows a magnetic head N, an external torch and welding N1, a duct for gas, pipeline for cooling and power wiring N2, an external mechanical support N3, a manual or motorized crank for welding control N4, an gas diffuser N6, and magnet holder plates or electromagnets N12.

On the inner side of welding plates A and B, FIG. 1 shows a magnetic head S, a gas diffuser S1, a visual inspection camera S2, a duct for gas, pipeline for cooling and power wiring S3, wheels or bearings for stability and translation S5, and magnet holder plates or electromagnets S12.

The expanded 120 mm long internal gas diffuser S1 next to the head and the external gas diffuser N6 of 120 mm, contributes to the proper cooling of the entire area on the back and front in the shortest time, to allow the excess temperature to modify as little as possible the physical and metallurgical properties of the material.

The invention of welding and magnetic coupling simplifies and modifies important components of the equipment used today.

The system allows to modify or redesign the construction of different fundamental sets of equipment.

It improves the precision and raises the amount of performance of the machinery.

The system is more precise than the current solutions used by the technique facilitating the execution of the operations and in some cases drastically reducing the production times.

The system does not use mechanical arms for internal supports providing a new functionality and increasing the possibilities of successive developments that favor the technological advance in different sectors for the industry.

2) Inner (S) Southern Welding with Magnetic Coupling

Figure 2:
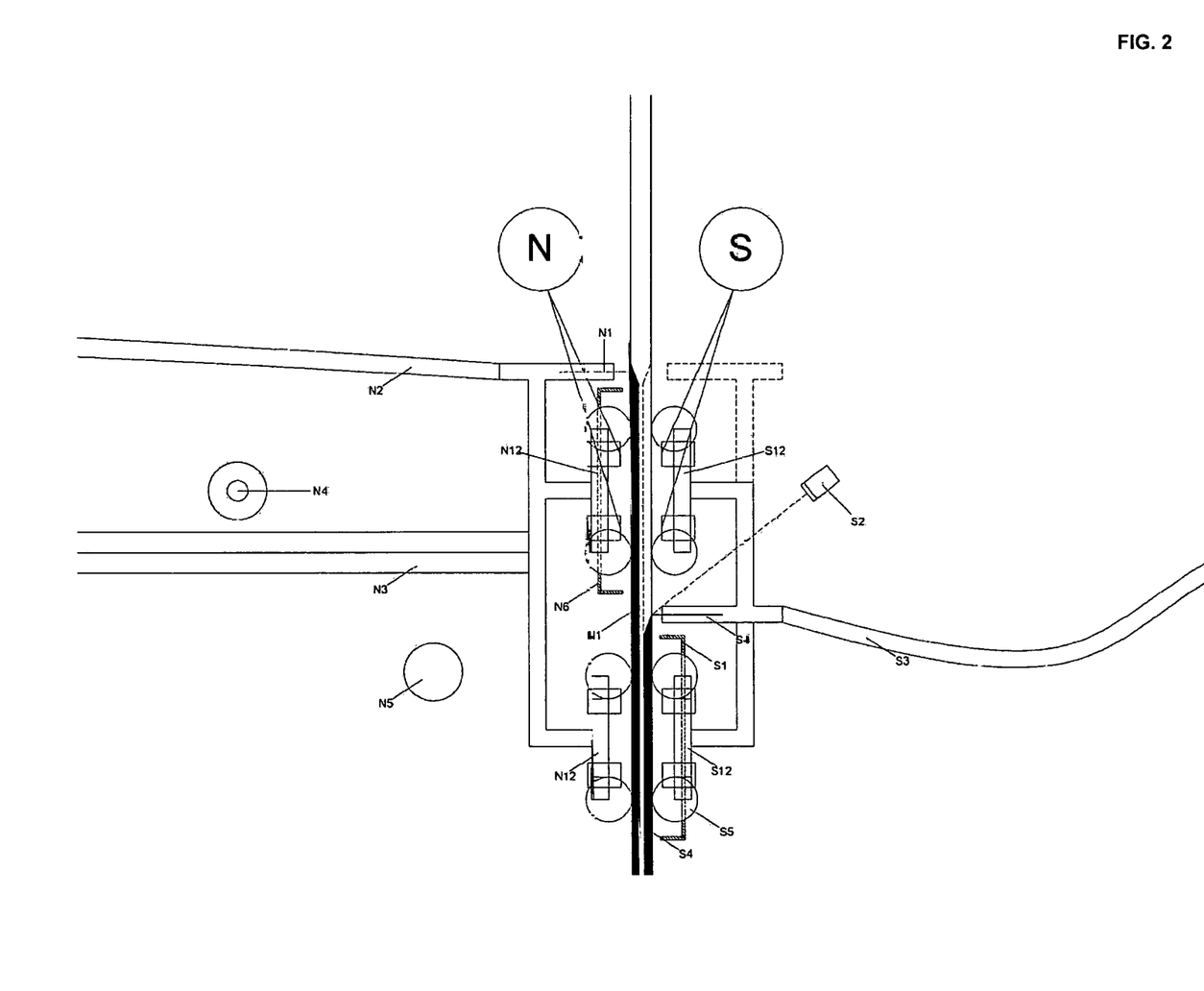
FIG. 2 shows another embodiment of the control head and magnetic holder.
Figure 3:
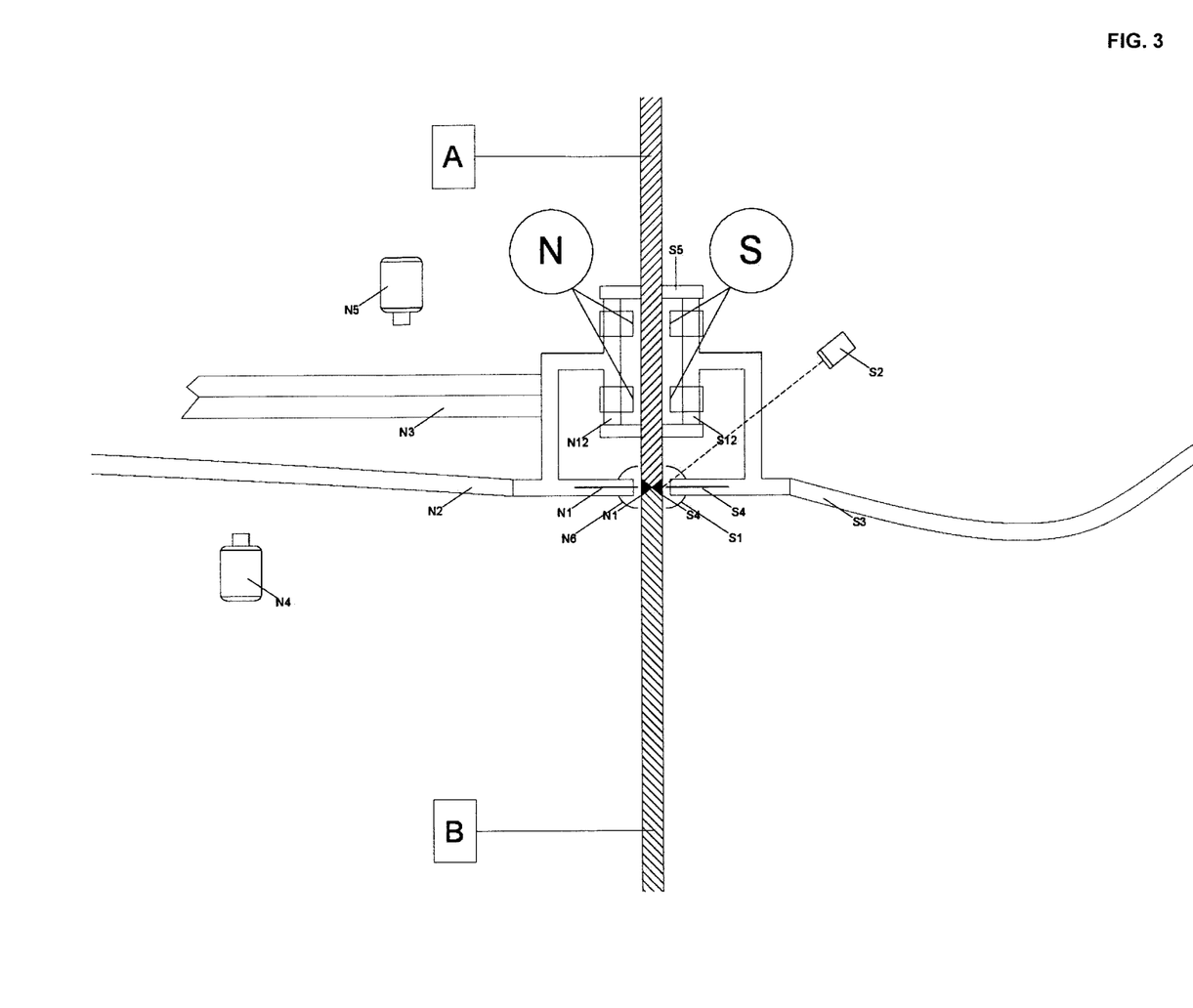
FIG. 3 shows another embodiment of the control head and magnetic holder.

FIGS. 2 and 3 shows embodiments of double automatic and simultaneous welding with magnetic coupling for industry. The invention and approach of this development lies in welding both sides (N) and (S) simultaneously, bringing the least amount of energy possible to melt the metal on both sides of the plates A and B, precisely centering, locating and dosing the right amounts of the two most important elements, energy and gas.

FIG. 2 shows, on the outer side of the welding plates, a magnetic head N, an external torch and welding N1, a duct for gas, pipeline for cooling and power wiring N2, an external mechanical support N3, a manual or motorized crank for welding control N4, a manual or motorized crank for positional control of the magnetic (S) south head N5, a gas diffuser N6, and magnet holder plates or electromagnets N12.

On the inner side of welding plates, FIG. 2 shows a magnetic head S, a gas diffuser S1, a visual inspection camera S2, a duct for gas, pipeline for cooling and power wiring S3, a torch and inner weld S4, wheels or bearings for stability and translation S5, and magnet holder plates or electromagnets S12.

FIG. 3 shows, on the outer side of the welding plates, a magnetic head N, an external torch and welding N1, a duct for gas, pipeline for cooling and power wiring N2, an external mechanical support N3, a manual or motorized crank for welding control N4, a manual or motorized crank for positional control of the magnetic (S) south head N5, a gas diffuser N6, and magnet holder plates or electromagnets N12.

On the inner side of welding plates, FIG. 3 shows a magnetic head S, a gas diffuser S1, a visual inspection camera S2, a duct for gas, pipeline for cooling and power wiring S3, a torch and inner weld S4, wheels or bearings for stability and translation S5, and magnet holder plates or electromagnets S12.

The invention allows the symmetrical distribution of caloric energy and inert gas with purge plus cooling on both sides of the plates A and B simultaneously, directly impacting on the equilibrium of the external and internal stresses of the material, thereby achieving lower deformation indices with higher levels of strength and stability of welded structures by this method.

The support arm used by the current technology internally backs, but it has difficulties to approach with millimetric precision to the plate allowing in turn the irregular escape of gas and the harmful entry of oxygen.

The backing currently conducts gas to the back, but does not allow the welding of the opposite side in the sheet because it lacks the precision and the necessary control by the operator.

The key to understanding the technical projection of the magnetic coupling (N) and (S) is that the new system offers the exclusive possibility of backing with gas and indistinctly welding the interior tightly and at a greater distance.

Existing implements fulfill only a limited single function and work only as mechanical support for the inert gas diffuser as unilateral backing in the inside.

The magnetic head S works absolutely without the mechanical support used in the present, offering the very important possibility of welding, from the inside and the outside simultaneously, the plates A and B with two complete and independent parallel heads.

The invention of the magnetic coupling gives the possibility of fully weld the back and front of the plates A and B carrying out the assembly of two complete welding heads, with magnets or electromagnets N12 and S12, on each side respectively, that ensure the correct positioning of the equipment N and S suitably positioned and aligned by electromagnetism.

A thin, lightweight polymer pipeline transports argon to the extended gas diffusers N2 and S3.

It is accompanied by wiring with electrical energy belonging to the independent welding source up to the inner head S suspended and magnetically positioned.

The head S has a welding torch N1 with an energy source and gas duct independent of the head N.

It performs internal welding and gassing S at the same time as its counterpart coupled externally N does it.

The mass and complexity of the device makes it necessary to use sufficient power in the coupling plates through powerful electromagnets so that the invention of the double localized N and S welding and gassing system can maintain the correct and precise position.

Its internal positioning is controlled through electromagnetism from the outside.

This double welding system allows simultaneous binding and at the same time of the plates A and B without beveling.

The invention welds plates A and B of various sizes of 8, 12 or 14 mm without the need to perform chamfers on either side, saving time, technically weldering in a consistent and homogeneous way.

A source with a TIG MIG laser or plasma system, welds directly the edges of the material without the need for wire as extra material in case the plates A and B are sufficiently close together by their edges.

The System and Equipment have Two Clearly Defined North N and S South Halves

The side (N) of the invention functions close to the operator just in front of the sheet or plate to be welded.

From the outside, the controls of the automatic system are carried out, the conductors N of the second internal driven head S being realized through the magnetism of several force fields, common on both sides and compatible with inverted polarity.

The internal side (S) of the welding head functions mirror and on the back of the plate and out of the visual of the operator directly, being driven through the magnetic field from outside (N) by the force and firm magnetic positioning of magnets or electromagnets.

The (N) side has everything that is needed to weld the metal on the outside.

North (N) Side Welding Rolling Head

The rolling and external (N) welding head has a complete torch of the TIG, MIG, plasma or single or hybrid laser system with power wiring argon inert gas hoses or mix according to the particular technical requirements.

It has the controls so that the operators make the operational adjustments directly on the (N) side, verifying the position and details at the moment of the entire welding process.

Positioning and location of angles in the torch or in the electrodes if there were any, plus all the fine tuning of cranks, necessary electrical adjustments of step motors in case of having remote controls etc.

The handling implements for the welds are pertaining to the magnetic (N) head.

Voltage, amperage, penetration and energy controls as well as the most suitable protection gas flows are from the energy sources used and argon gas tubes, manometers and corresponding flowmeters.

The side (N) of the head also has one, two or more metal plates of quadrangular paramagnetic aluminum articulated and mobile of 125 mm of side, but can be of other materials, with 2, 4, 8 or more electromagnets arranged in a same polarity and adjustable, or permanent magnets of high power and energy.

This plate and this system are moved side by side and parallel to the automatic welding torch by rolling and containing several force fields which are the external support and the positional conductor at a distance of the other half that is in the interior and similar, welding the back, or in fact simply backing and transporting inert gas.

The invention and the development of the external welding head (N), is the final end of an external electromechanical support column or platform, but it does not aspire to be recognized as an original invention as well as power welding sources and other mechanical and electrical elements, pressure gauges, flow meters, hoses, screens and audiovisual control cameras, etc.

This external electro-mechanical support platform (N8) is of many different designs according to the applications and characteristics of the place where it works and the necessary and specific functionality required.

The invention of the head and magnetic (N) and (S) welding system has the ability to work in horizontal and static form.

At the same time, a rotating base N9 gives the circular and electromechanically controlled movement of the pipe or piece by developing the most suitable tangential speed suitable for welding according to the working radius and perimeter.

The magnetic head has multiple joints and is able to weld vertically and horizontally in the same place all types of joints in different positions.

Figure 4:
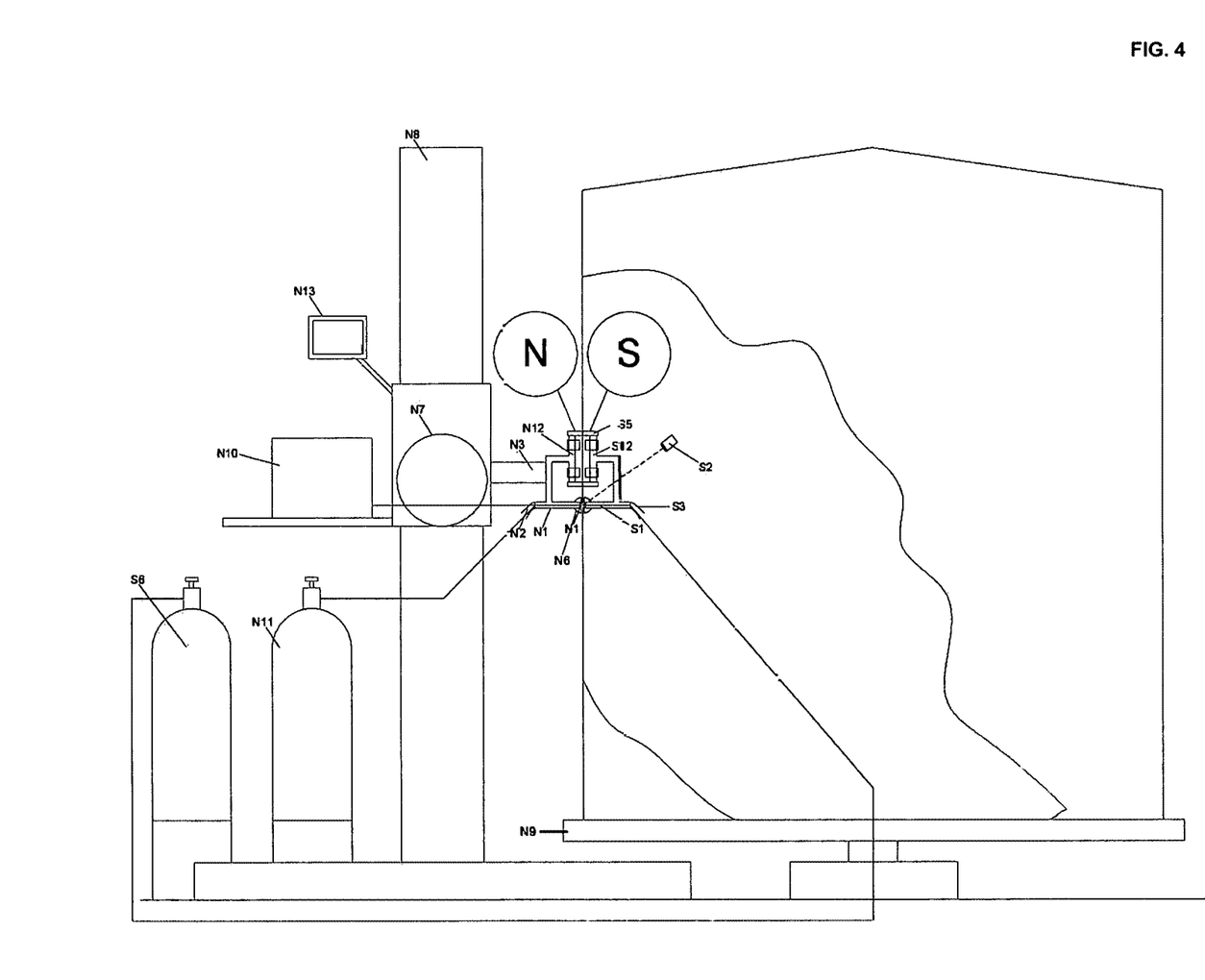
FIG. 4 shows another exemplary embodiment the control head and magnetic holder.

FIG. 4 shows an external column of support and external vertical displacement platform N8 can carry out the necessary vertical movement by making the invention of the magnetic welding head operate by moving upwards or downwards on the same rotating base. This basis for this operation remains static.

FIG. 4 shows, on the outer side of the welding plates, a magnetic head N, an external torch and welding N1, a duct for gas, pipeline for cooling and power wiring N2, an external mechanical support N3, a manual or motorized crank for welding control N4, a manual or motorized crank for positional control of the magnetic (S) south head N5, a gas diffuser N6, a coil roll (wire) N7, speed controlled electromechanical rotating base N9, source for external welding N10, an exterior inert gas pipe N11, magnet holder plates or electromagnets N12, and an external visual inspection screen for side (S) welding N13.

On the inner side of welding plates, FIG. 2 shows a magnetic head S, a gas diffuser S1, a visual inspection camera S2, a duct for gas, pipeline for cooling and power wiring S3, wheels or bearings for stability and translation S5, an inert gas tube for interior S12, and magnet holder plates or electromagnets S12.

The magnetic welding system provides the possibility to work and weld by gravity on top of pipes, tanks or the like.

The pieces in this case turn by rolling supported on rollers of rubber or polyurethane.

This configuration requires the parts to be welded to rotate on rollers arranged in the base on the floor.

This system is usually of vital importance because it allows the welding or gassing of pipes and containers of relatively low diameters in relation to their length (N) and (S), such as tanks for the transport of dairy products 9 or 10 m long and diameter between 1.5 m and 2 m approximately.

It also allows welding and joining of pipe sections and sectors for the industry.

Rolling Welding Head (S) Side, Automatic, Independent from Positional Magnetic Control The head (S) of the invention is the part of the system which functions on the inner back and out of direct reach of the operators.

The invention of the magnetic head welds and binds or backs with gas the internal face and the back of the plates A and B in similar way as to the welding quality of its counterpart corresponding to the outer side (N). It can count on TIG MIG plasma systems Laser or hybrid in the case of plates of several millimeters.

This internal system carries high resolution cameras S2 that provide audiovisual information to the operator instantly.

The process is controlled by a screen N13 arranged next to the operators outside. Making it possible to send variations of the required amperage or gas flows to the inner (S) side of the plate, in order to maintain the best possible working conditions on the back.

The magnetic device corresponding to the side (S) of the welding system is the core of the invention, because in its physically isolated interior and out of the direct reach of the operator can carry energy and inert gas to the torch and internal diffuser if necessary.

If the technical requirements require it, it can transfer only inert gas to the diffuser as a backing of the weld bead, with no arms and mechanical supports of any kind.

When the weight or mass of the assembly (S) requires it, the design must foresee this condition and give priority to the use of adjustable electromagnets with sufficient power.

If the configuration and design of the head is light for thin plates or sheets with permanent magnets, will be sufficient to maintain the position, while purging with inert gas ensuring the best oxygen-free atmosphere condition for welding on the back.

A very important detail to consider is the special attention that requires the design of the device taking into account the most appropriate distance between the high temperature points and the magnets in case of being permanent.

If the decision is to use neodymium magnets, the heat radiating from the source and the electric arc can lead to the collapse of the system, due to the magnetic losses of the magnets due to the effects of excessive heat, which arrives by conduction through the material, coming of the weld very close and without the sufficient distance to dissipate the effects of the temperature.

Therefore, the distance must be calculated and agreed to avoid collapse of the magnetic system described.

The inner magnetic head (S) is of similar characteristics to the outer magnetic head (N).

It has articulated and movable aluminum quadrangular plates S12 of 125 mm side or more, also counts in the configuration magnets or electromagnets N12 of inverted polarity with respect to the side.

It does not have the position controls since that parameter is directed from the outside (N) through the force and magnetic control by the operator making use of the audiovisual information.

The heads are millimetrically placed and parallel to the two sides of the plates A and B working simultaneously coordinated at the same speed of displacement.

Figure 5:
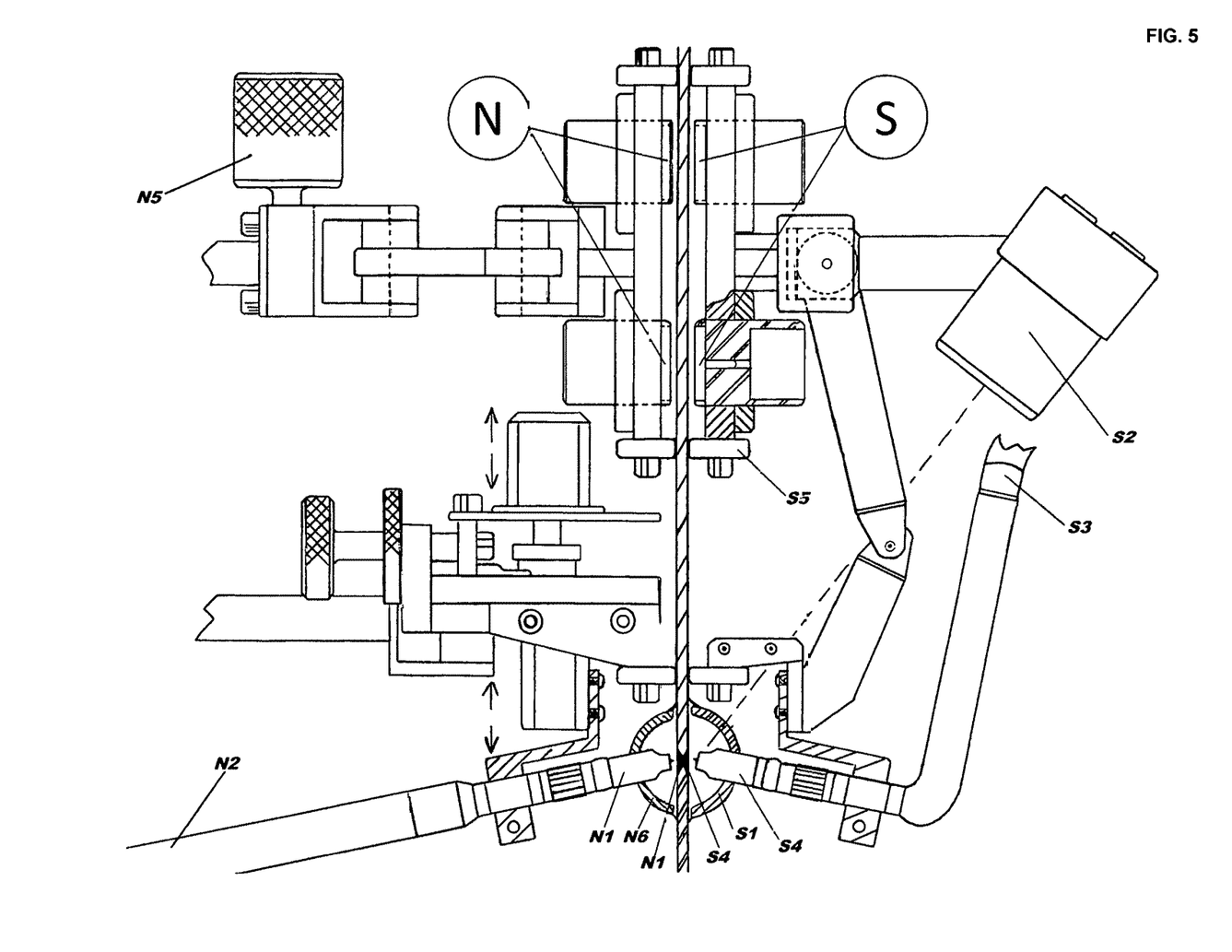
FIG. 5 shows a view of the inner and outer sides of the invention in one embodiment.

FIG. 5 shows, on the outer side of the welding plates, a magnetic head N, an external torch and welding N1, a duct for gas, pipeline for cooling and power wiring N2, a manual or motorized crank for positional control of the magnetic (S) south head N5, and a gas diffuser N6.

On the inner side of welding plates, FIG. 5 shows a magnetic head S, a gas diffuser S1, a visual inspection camera S2, a duct for gas, pipeline for cooling and power wiring S3, a torch and inner weld S4, and wheels or bearings for stability and translation S5.

Double Magnetic and Automatic Welding Head (N) and (S) with Inert Backing of Highly Pure Argon Gas Special for TITANIUM The double magnetic head welding and inert gas of this invention is the most suitable and advanced automatic welding system currently available for TITANIUM.

Our double welding system is the only one in the world that meets the chemical and physical needs at high temperatures to technically weld correctly and automatically the TITANIUM.

TITANIUM alloys are reactive at high temperatures and extremely permeable to atmospheric or surface contamination of fats, oils, etc.

Properly welding TITANIUM means maintaining strict control of all parameters and the highest purity and hygiene of the whole process that is carried out at elevated temperatures at all possible angles.

In order to weld TITANIUM, the fusion must be isolated as only this magnetic method can be carried out automatically in the present time in the world.

The magnetic system isolates the fusion integrally from the front (N) and the back (S) simultaneously.

Our double welding magnetic system maintains the purity and protects the TITANIUM first, then melts by raising the temperature and cools quickly in an inert atmosphere at all times.

Our welding system respects TITANIUM chemically and maintains its metallurgical properties even after soldering to and including cooling.

The inert gas soldering and backing magnetic system of this invention DOES NOT PERFORM perforations in the material as if it produces the friction system that is currently used to weld aluminum-only cryogenic tanks for space launches.

Our magnetic invention overcomes today's friction stirring system. Our magnetic system welds STEEL, TITANIUM and ALUMINUM.

The friction and agitation system only works on aluminum acceptably at 426° C. (800° F.).

The friction and agitation system only unites aluminum acceptably because the probe used wears out and leaves the debris inside the joints walls in steel and titanium.

The friction system does not allow the use of inert gas on both sides and DOES NOT PROTECT the material from all angles, therefore producing brittle and contaminated joints with undesired debris inside the steel and preferably in the TITANIUM.

Our invention of the magnetic system does not produce holes in any of the joints.

Double Tig or Mig laser welding with inert gas without undesired mechanical forces in the material. Our welding system makes connections with the best technology nowadays available and protects with inert gas at all times, not making contact or contaminating the TITANIUM.

The double magnetic control weld of this invention is constant along the path.

Friction welding is not constant because the mechanical probe is being destroyed throughout the welding, polluting the parts and varying material flows if the temperature exceeds the resistance of the screw used in high melting alloys such as steel and titanium.

The double soldering magnetic system is the only one in the world to regulate the torsion and tension of the welded plates, because it allows the energy to be sent independently to each side, allowing designers to direct the direction of twisting and material tensions previously, on the same design table. Engineers and designers with the dual welding magnetic system can direct the curvature of the aircraft wing previously, on the design table, calculating and quantifying the energy values applied to each side (N) and (S) of the plates of TITANIUM, magnesium and aluminum.

The invention claimed is:

1. A system for automatic welding, comprising:
   an outer rolling welding head, wherein a north side of said outer rolling welding head is located on one side of a plurality of plates to be welded, comprising:
   a plurality outer of holder plates of magnets comprising wheels for an outer rolling bearing head;
   at least one external welding torch attached to said plurality of outer holder plates of magnets;
   a diffuser to supply inert gas cooling and backup to said outer rolling welding head; and
   a rolling inner welding head, wherein a south side of said inner rolling welding head is located on the opposite side of said plates to be welded, comprising:
   a plurality of inner holder plates of magnets comprising wheels or bearings opposite said outer rolling bearing head;
   at least one internal welding torch attached to said inner plates carrying magnets or electromagnets; and
   a diffuser to supply inert gas cooling and backup to said inner welding head.

2. The system according to claim 1 wherein said system is a TIG-MIG hybrid system.

3. The system according to claim 1 wherein the north side of said outer rolling welding head comprises at least one remote control.

4. The system according to claim 1, wherein said inner welding head is controlled by at least one remote control and by visual inspection of at least one screen with at least one camera.

* * * * *